July 12, 1966 R. TAESLER 3,260,436
CONVEYING DEVICE FOR WIDE MOTION PICTURE FILM
Filed Nov. 12, 1964 2 Sheets-Sheet 1

July 12, 1966 R. TAESLER 3,260,436
CONVEYING DEVICE FOR WIDE MOTION PICTURE FILM
Filed Nov. 12, 1964 2 Sheets-Sheet 2

United States Patent Office 3,260,436
Patented July 12, 1966

3,260,436
CONVEYING DEVICE FOR WIDE MOTION PICTURE FILM
Rudolf Taesler, Stuttgart, Germany, assignor to Zeiss Ikon Aktiengesellschaft, Stuttgart, Germany
Filed Nov. 12, 1964, Ser. No. 410,412
Claims priority, application Germany, Nov. 27, 1963, Z 10,499
12 Claims. (Cl. 226—64)

The invention relates to a conveying device for wide motion picture film, in particular for film provided with a number of picture rows arranged one next to another. The picture rows are produced on the film one after the other during the movement of the film in its longitudinal and transverse direction by exposure through an objective and are scanned thereafter for reproduction.

It is known to convey a film provided with a number of rows of pictures which are arranged one adjacent the next one by means of sprocket rollers. Such conveying means are stable but relatively expensive in their production. Furthermore, such feed or sprocket rollers have the substantial disadvantage that they are unable to engage the perforated aperture or aperture pairs arranged next to the just presented picture section which would unfavorably influence the picture position. This arrangement is, for instance, not suitable because a sprocket roller would cover up the projection light beam and would prevent a projection with light passing through the picture.

Another reason why different conveying means would be desirable resides in the large space which sprocket rollers require, the more so, since their diameter cannot be smaller than a predetermined minimum size, if an orderly engagement of the sprocket teeth in the perforations of the film is to take place.

It is an object of the invention to provide an accurate, dependable and easily operable film conveying device which is transversely movable to the photographic objective and is equipped with the least amount of mass for conveying a wide motion picture film.

This object of the invention is attained by providing a substantially U-shaped bail structure with gripping teeth whose movement into and out of the film perforations is controlled by an electric magnet. This bail structure is mounted pivotally on a thin plate which is arranged parallel to the plane of the film. This thin plate in turn is slidably mounted in the direction of the film on a thicker plate which is transversely movable to the film.

It is another object of the invention to make the thin plate very easily movable relative to the thicker plate by mounting it on balls.

These and other objects of the invention will now be described in the following description with reference to the accompanying drawings which illustrate one particular embodiment of the invention.

Figure 1:
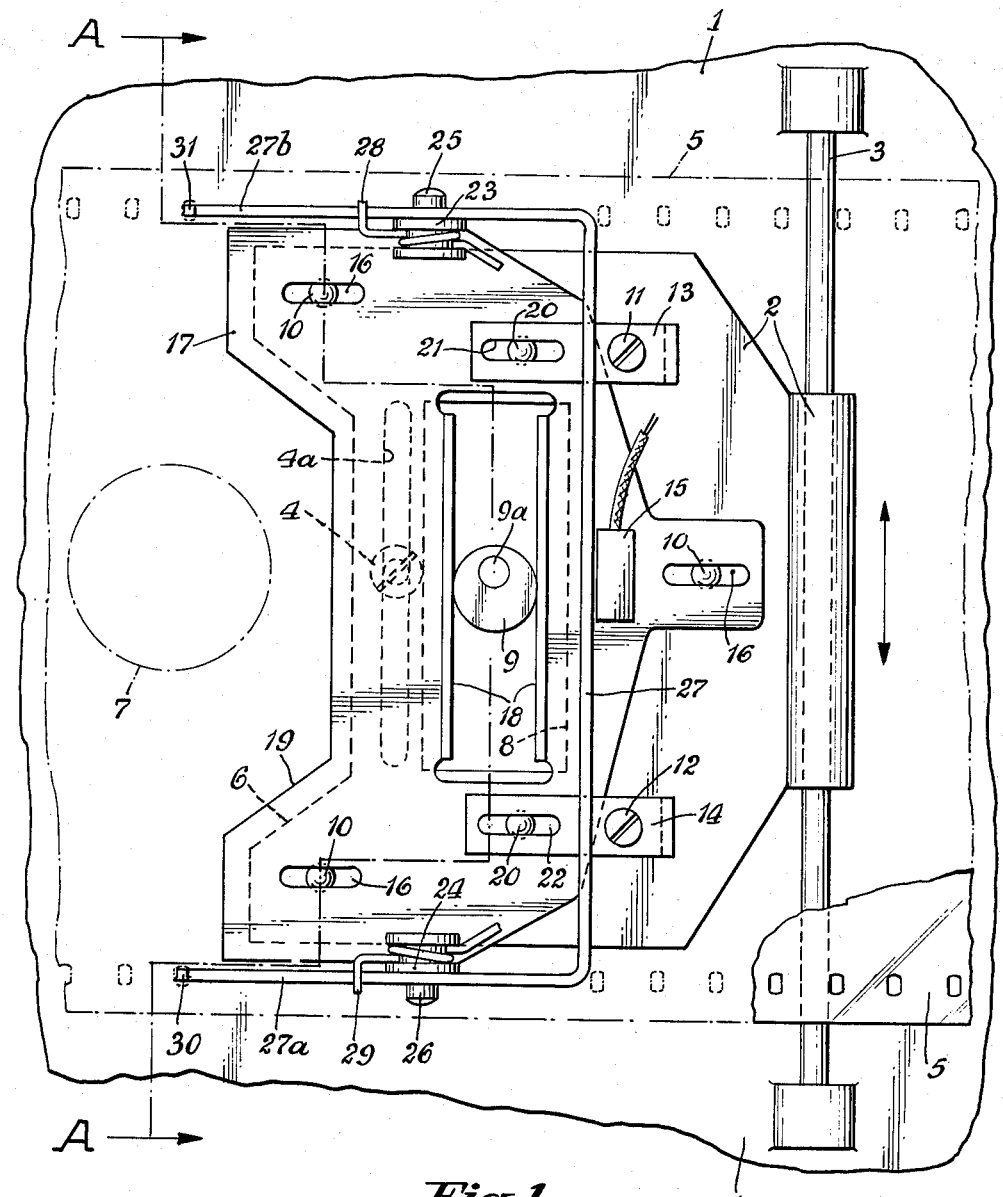
FIG. 1 illustrates a top elevation view of the film conveying device.
Figure 2:
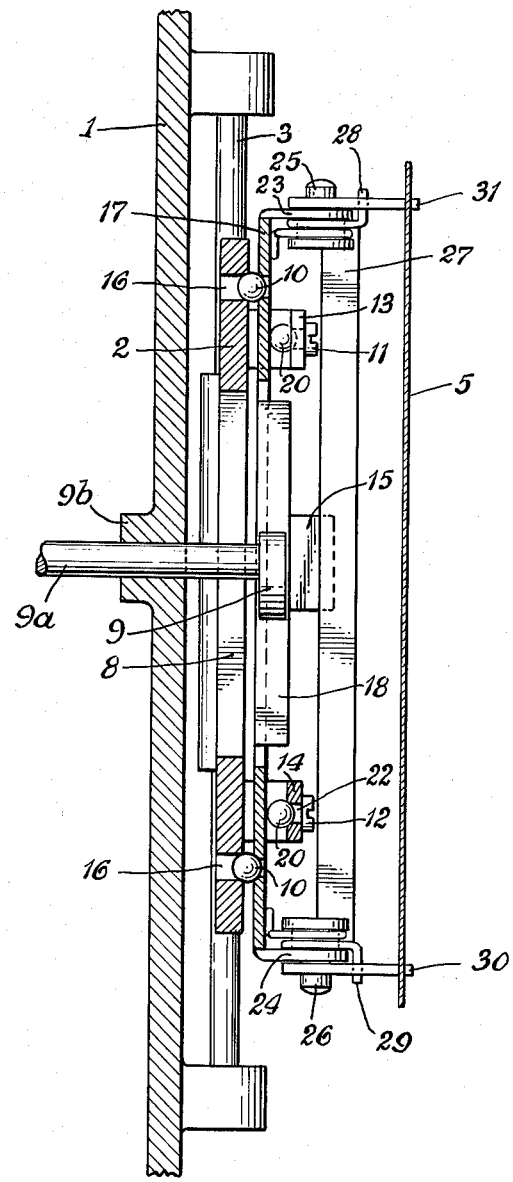
FIG. 2 is a sectional view along the broken line A—A of FIG. 1.

Referring to the drawings, the housing wall 1 has mounted in spaced and parallel relation thereto a guide rod 3 which slidably supports one end of a thick plate 2 which by means of a pin-screw-slot guide 4, 4a is transversely movable with respect to the film 5. The other end of the plate 2 is provided with a recess 6 which keeps the photographic objective 7 uncovered which also is mounted on the housing wall 1. The plate 2 is also provided between its ends with a relatively wide slot 8 which extends parallel to the rod 3 and permits the passage of an eccentric drive member 9 whose shaft 9a is supported in a stationary bearing 9b in the wall 1. The plate 2 furthermore is provided with three linear guides for three balls 10. These linear guides extend lengthwise of the film 5. Adjacent these three balls 10 the plate 2 has attached thereto resilient abutments 13 and 14 secured by screws 11 and 12.

The three balls 10 are engaged by a thin conveyer plate 17 which is guided in longitudinal slots 16 lengthwise of the film 5. This thin plate 17 carries an electromagnet 15 and is also provided with a transverse slot 18 between its ends and a recess 19 at the end closest to the objectives 7. The resilient abutments 13, 14 on the thick plate 2 project over the thin conveyer plate 17 and urge the latter by means of balls 20 against the balls 10. The balls 20 are placed in slots 21 and 22 provided in the abutments 13 and 14. A special guide for the balls 20 on the conveyer plate 17 is not necessary and is therefore dispensed with. Of course, if desired, such a guide may be provided.

The edges of the conveyer plate 17 which extend parallel to the edges of the film 5 are provided with perpendicular bearing lugs 23 and 24 to which bearing pins 25 and 26 are secured. A U-shaped bail 27 made of a strip of sheet metal or the like is pivotally mounted with its parallel legs to these bearing pins 25, 26 which latter extend to apertures provided in the legs 27a and 27b between the ends thereof. The free ends of the legs 27a and 27b are provided with laterally projecting teeth 30 and 31 for engaging the perforations in the film 5. Coil springs 28 and 29 with outwardly extending arms surround the bearing pins 25, 26 and their arms engage the legs 27a, 27b and the thin plate 17 respectively, in such a manner that the teeth 30, 31 on the bail 27 are normally held out of engagement with the perforations in the film until such a time that other forces overcome the tension of the springs 28, 29. The thin plate 17 and the bail 27 may be stiffened by providing the same with embossed ridges or the like.

The operation of the conveying device is as follows: Upon rotation of the eccentric 9 by a not disclosed drive mechanism the thin conveyer plate 17 is reciprocated lengthwise of the film because the eccentric 9 engages the longitudinal walls of the slot 18 in the plate 17. The result is that also the bail 27 and the electromagnet 15 are likewise reciprocated in the same direction. Depending upon the position of the not illustrated shutter for the photographic objective and the position of a not illustrated switch, the electromagnet is alternately energized. In its energized condition the electromagnet will attract the bail 27 and cause the teeth 30, 31 thereon to engage the perforations in the film 5. Since the electromagnet is arranged closely to the path of movement of the bail, any disturbing noise of operation is prevented.

What I claim is:

1. A conveying device for wide motion picture film having a plurality of rows of pictures thereon which were produced thereon and are projected one row after the other by moving said film alternately lengthwise one row and then transversely, said device comprising a substantially U-shaped bail member provided on its legs with gripping teeth for engaging and disengaging the perforations provided in said film, a first plate on which said bail member is pivotally mounted about an axis extending transversely to and between the ends of the legs of said bail member, an electromagnet mounted on said first plate and adapted when energized to pivot said bail member into a position in which its teeth enter into the perforations of said film, a second plate arranged parallel to said first plate and slidably supporting said first plate lengthwise of said film, and means for slidably mounting said second plate transversely to said film on a stationary guide member.

2. A conveying device for wide motion picture film having a plurality of rows of pictures thereon which were produced thereon and are projected one row after the other by moving said film alternately lengthwise one row and then transversely, said device comprising a substantially U-shaped bail member provided on its legs with gripping teeth for engaging and disengaging the perforations provided in said film, a first plate on which said bail member is pivotally mounted about an axis extending transversely to and between the ends of the legs of said bail member, an electromagnet mounted on said first plate and adapted when energized to pivot said bail member into a position in which its teeth enter into the perforations of said film, a second plate arranged parallel to said first plate and slidably supporting said first plate by means of balls lengthwise of said film, and means for slidably mounting said second plate transversely to said film on a stationary guide member.

3. A conveying device according to claim 1, in which said first plate is slidably supported by said second plate by means of three balls each of which project into guide slots provided in said plates, said guide slots extending lengthwise of said film, two of said guide slots being located adjacent said gripping teeth and the third guide slot in the center line of said plates and in rear of the pivot axis of said bail member.

4. A conveying device according to claim 1, including an eccentric drive having an eccentric engaging a transverse slot in said first plate for moving the latter back and forth lengthwise of said film.

5. A conveying device for wide motion picture film having a plurality of rows of pictures thereon which were produced thereon and are projected one row after the other by moving said film alternately lengthwise one row and then transversely, said device comprising a substantially U-shaped bail member provided on its length with gripping teeth for engaging and disengaging the perforations provided in said film, a first plate on which said bail member is pivotally mounted about an axis extending transversely to and between the ends of the legs of said bail member, an electromagnet mounted on said first plate and adapted when energized to pivot said bail member into a position in which its teeth enter into the perforations of said film, a second plate arranged parallel to said first plate and slidably supporting said first plate lengthwise of said film, means for slidably mounting said second plate transversely to said film on a stationary guide member, and an eccentric drive having an eccentric engaging the two parallel walls of a transverse slot in said first plate for reciprocating the latter in a direction lengthwise of the film, the length of said transverse slot being equal to the required transverse movement of said first plate accomplished by said second plate.

6. A conveying device according to claim 1, in which said first plate is slidably supported by said second plate by means of three balls each of which project into guide slots provided in said plates, said guide slots extending lengthwise of said film, two of said guide slots being located adjacent said gripping teeth and the third guide slot in the center line of said plates and in rear of the pivot axis of said bail member, and including two abutment brackets attached to the rear of said second plate and extending over said first plate, and balls arranged between said abutment brackets and the top face of said first plate, whereby the latter is held movably by means of said three balls against said second plate.

7. A conveying device for wide motion picture film having a plurality of rows of pictures thereon which were produced thereon and are projected one row after the other by moving said film alternately lengthwise one row and then transversely, said device comprising a substantially U-shaped bail member provided on its legs with gripping teeth for engaging and disengaging the perforations provided in said film, a first plate on which said bail member is pivotally mounted about an axis extending transversely to and between the ends of the legs of said bail member, an electromagnet mounted on said first plate and adapted when energized to pivot said bail member into a position in which its teeth enter into the perforations of said film, a second plate arranged parallel to said first plate and slidably supporting said first plate lengthwise of said film, and means for slidably mounting said second plate transversely to said film on a stationary guide member, said second plate being slidably supported with one of its ends on a stationary rod extending transversely to the longitudinal direction of said film, while the other end of said second plate has a transverse slot slidably engaging a fixedly mounted pin guide member.

8. A conveying device according to claim 1, in which said electromagnet is mounted on said first plate in such a position to attract when energized the base portion of said bail member.

9. A conveying device according to claim 1, in which said electromagnet is mounted on said first plate in such a position to attract when energized the base portion of said bail member, and including springs at the pivot points of said bail member for lifting the teeth of the same from the perforations of the film when the electromagnet is deenergized.

10. A conveying device according to claim 1, in which said electromagnet is mounted on said first plate in such a position as to attract when energized the base portion of said bail member, said base portion moving closely to the electromagnet without engaging the same.

11. A conveying device according to claim 1, in which said first plate is relatively thin and is provided with embossed ridges for stiffening the same.

12. A conveying device according to claim 6, in which said abutment brackets are resilient.

References Cited by the Examiner

UNITED STATES PATENTS

| | | | |
|---|---|---|---|
| 1,395,137 | 10/1921 | Pluderi | 352—82 |
| 2,168,043 | 8/1939 | O'Grady | 226—68 |
| 2,772,325 | 11/1956 | Gaite | 226—62 X |

M. HENSON WOOD, JR., *Primary Examiner.*

J. ERLICH, *Assistant Examiner.*